United States Patent [19]

Celio

[11] Patent Number: 4,580,217
[45] Date of Patent: Apr. 1, 1986

[54] HIGH SPEED MEMORY MANAGEMENT SYSTEM AND METHOD

[75] Inventor: John A. Celio, San Diego, Calif.

[73] Assignee: NCR Corporation, Dayton, Ohio

[21] Appl. No.: 506,923

[22] Filed: Jun. 22, 1983

[51] Int. Cl.⁴ .................... G06F 12/14; G06F 12/08; G06F 13/00; G11C 9/06

[52] U.S. Cl. .................................................. 364/200

[58] Field of Search ... 364/200 MS File, 900 MS File

[56] References Cited

U.S. PATENT DOCUMENTS

| | | | |
|---|---|---|---|
| 3,761,881 | 9/1973 | Anderson et al. | 364/200 |
| 4,079,453 | 3/1978 | Dahl | 364/200 |
| 4,096,568 | 6/1978 | Bennett et al. | 364/200 |
| 4,151,593 | 4/1979 | Jenkins et al. | 364/200 |
| 4,170,039 | 10/1979 | Beacom et al. | 364/200 |
| 4,177,512 | 12/1979 | Moggia | 364/200 |
| 4,241,401 | 12/1980 | De Ward et al. | 364/200 |
| 4,410,941 | 10/1983 | Barrow et al. | 364/200 |
| 4,430,705 | 2/1984 | Cannavino et al. | 364/200 |

OTHER PUBLICATIONS

IBM Tech. Discl. Bull., vol. 28, No. 2, Jul. 1975 (New York), Masog et al., "Compatible Expanded Storage Addressability", pp. 525-526.

IBM Tech. Discl. Bull., vol. 16, No. 6, Nov. 1973 (New York), Boehner et al., "Multiprocessor Interface", pp. 1847-1848.

*Primary Examiner*—James D. Thomas
*Assistant Examiner*—William G. Niessen
*Attorney, Agent, or Firm*—J. T. Cavender; Edward Dugas; Floyd A. Gonzalez

[57] ABSTRACT

A virtual address and access protection code stored at that address are fetched simultaneously from secondary memory and stored in corresponding locations in first and second content addressable memories. When a program-generated virtual address is later applied to the first content addressable memory, corresponding access code is simultaneously applied to the second content addressable memory. Match signals obtained simultaneously from corresponding locations in both content addressable memories are combined to produce an access control signal to control access to data stored at a real memory address corresponding to the matched virtual address.

10 Claims, 7 Drawing Figures

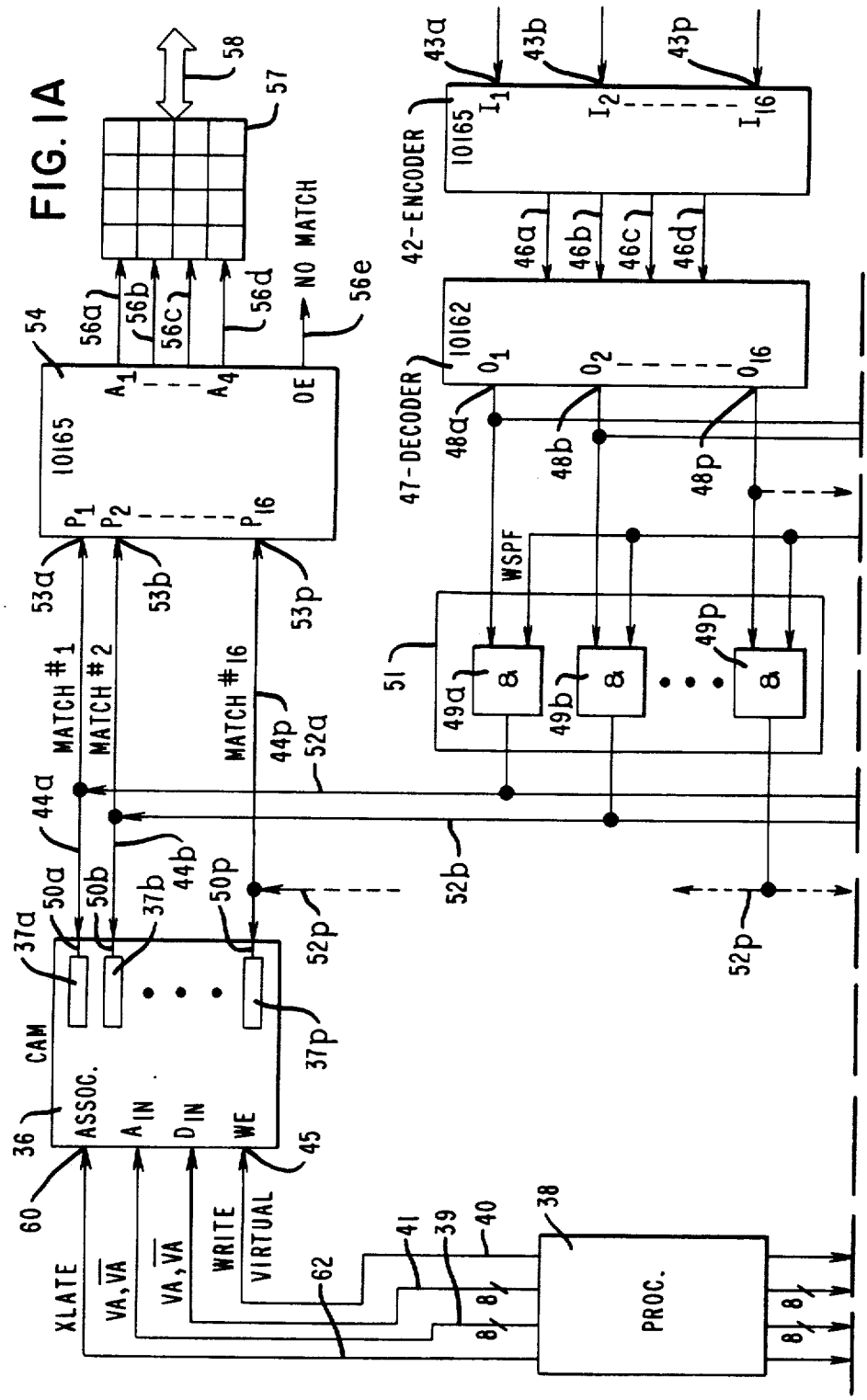

HIGH SPEED MEMORY MANAGEMENT SYSTEM AND METHOD

BACKGROUND OF THE INVENTION

1. Field of the Invention

This invention relates to memory management in which access protection information is examined simultaneously with translation of the virtual address of the protected signal.

2. The Prior Art

Every computer has at least one section in which data is processed and at least one memory in which data is stored, either waiting to be processed or after it has been processed, or both. It is desirable to have the memory as accessible as possible to the processor and to have as much storage capacity as desired. However, some compromise is always necessary. There is always a limit to the amount of information that can be stored in a memory to which the processor has relatively rapid access, and so it is common to provide a less accessible memory, such as a disc or tape or other device, on which more information can be stored. The more accessible memory is commonly called the main, or primary, memory and the less accessible one a secondary, or auxiliary, memory.

A system having two or more memories related as has just been described is referred to as a hierarchical memory system. The secondary memory is connected in a hierarchical system in such a way that storage space in the main memory can be dynamically allocated to blocks of information fetched from the secondary memory when required by the program or programs running in the computer. The address of a data word in the secondary memory is referred to as its virtual address, and the address of the same data, when fetched from the secondary memory and stored in the main memory is referred to as its real, or physical, address. Data is not usually fetched one word at a time from the secondary memory; instead, a related block of words is fetched at one time for relatively temporary storage in the main memory. The same block may be fetched and replaced more than once in the execution of a program, and each time it is fetched, it may be stored at a different real address in the main memory. To simplify the programmer's task, hierarchical memory systems are arranged so that the data is always addressed by its virtual address, not by the real memory address, even though the data must be at a real address in the main memory when it is in use in a program.

The correlation between each virtual address and the corresponding real address of information brought into the main memory is kept track of automatically by translation means in the computer. In the course of executing a program, the computer generates virtual addresses that are automatically applied to address translation means to be translated into the corresponding real memory addresses. If those virtual addresses have already been fetched and stored in the translation means, the translations can be accomplished and access can thereby be obtained to the coresponding data fetched from the secondary memory and stored at those real addresses in the main memory. If such fetching of a virtual address has not previously taken place, the attempt at address translation will, of course, not yield a corresponding real address, and the virtual address, together with the data stored there in the secondary memory, will have to be fetched at that time.

Not all information fetched into main memory as just described can be used without restriction. If the information is being used in more than one program, security measures are required to ensure that one user's program does not illegally access or modify information that is private to another user (for example, bank account information). Nor is it permissible to modify the code of the operating system. There are still other reasons for denying access to information stored at certain virtual addresses, and all such denial may vary from program to program and even from time to time in the same program. Heretofore, the protection code, or attributes, have been fetched and stored in the real memory along with data that is to be protected, and it has been necessary to carry out the translation of the virtual address first and then to examine the information at the real address to learn if there were any access prohibition code included with the data stored there.

A number of U.S. Patents relating to memory management have come to the attention of Applicant and his attorneys during the preparation of this application and are included in the following list, but none of them suggests the present invention:

U.S. Pat. No. 3,588,839 entitled "Hierarchical Memory Updating System" by L. A. Belady et al.

U.S. Pat. No. 3,725,870 entitled "Parallel-Access Data File System" by M. Felcheck et al.

U.S. Pat. No. 3,811,117 entitled "Time Ordered Memory System and Operation" by R. A. Anderson, Jr. et al.

U.S. Pat. No. 4,055,851 entitled "Memory Module with Means for Generating a Control Signal that Inhibits a Subsequent Overlapped Memory Cycle During a Reading Operation Portion of a Reading Memory Cycle" by S. R. Jenkins et al.

U.S. Pat. No. 4,084,225 entitled "Virtual Address Translator" by L. D. Anderson et al.

U.S. Pat. No. 4,084,230 entitled "Hybrid Semiconductor Memory with On-Chip Associative Page Addressing, Page Replacement and Control" by R. E. Matick.

U.S. Pat. No. 4,096,568 entitled "Virtual Address Translator" by D. B. Bennett et al.

U.S. Pat. No. 4,177,510 entitled "Protection of Data in an Information Multiprocessing System by Implementing a Concept of Rings to Represent the Different Levels of Privileges Among Processes" by M. Appell et al.

U.S. Pat. No. 4,224,664 entitled "Apparatus for Detecting When the Activity of One Process in Relation to a Common Piece of Information Interferes with Any Other Process in a Multiprogramming/Multiprocessing Computer System" by M. G. Trinchieri.

OBJECTS AND SUMMARY OF THE INVENTION

One of the main objects of this invention is to reduce the total time for translating a virtual address into a real address and determining whether there is any access protection information that would affect the programmed memory operation for that entry.

Another object is to improve the virtual memory operation by translating the virtual memory address and simultaneously comparing, with program-generated protection decoding information, any recorded access control information related to the data stored in the real memory location.

Further objects will be apparent to those skilled in the art from studying the following specification and the accompanying drawings.

In accordance with this invention, when a virtual address is fetched from a less accessible memory and stored in a content addressable memory any access protection information stored at that virtual address is simultaneously fetched from the less accessible memory and is stored in a corresponding location in additional content addressable memory means. When all of the addresses in the first content addressable memory are compared with a virtual address generated by a program being executed, protection decode information is simultaneously compared with the access protection information stored in the additional content addressable memory means. If an address match is obtained for a virtual address at one of the locations in the first content addressable memory, the simultaneous comparison of the address match with the related access protection information stored at a corresponding location in the additional content addressable memory means will produce an access control condition. The condition may be in the form of a signal generated as a result of the simultaneous comparison, and the system may either be arranged so that such a signal will prevent access or so that it will permit access. Or the condition may be that access will be permitted or, alternatively, will be prohibited, unless a signal causing the contrary effect is generated simultaneously with address translation.

Thus, the additional time, which was formerly required to determine access limitation after a virtual address had been translated, is eliminated, and the speed of the computer is increased.

Further, in a memory management system including a first content addressable memory having first selected locations in which to store virtual address information to generate an address match signal in response to a program-generated virtual address signal, the invention comprises: additional content addressable memory means having second selected locations in which to store access control information related to the stored virtual address information in the first selected locations; means to supply a program-generated protection decode signal to the second content addressable memory means to generate a protection match signal simultaneously with the address match signal; and means to combine any protection match signal from one of said second selected locations with an address match signal from a corresponding first selected location to produce a real memory access control signal.

BRIEF DESCRIPTION OF THE DRAWINGS

FIGS. 1A and 1B are a block diagram of a circuit according to the present invention.

DETAILED DESCRIPTION OF A PREFERRED EMBODIMENT

Figure 1B:
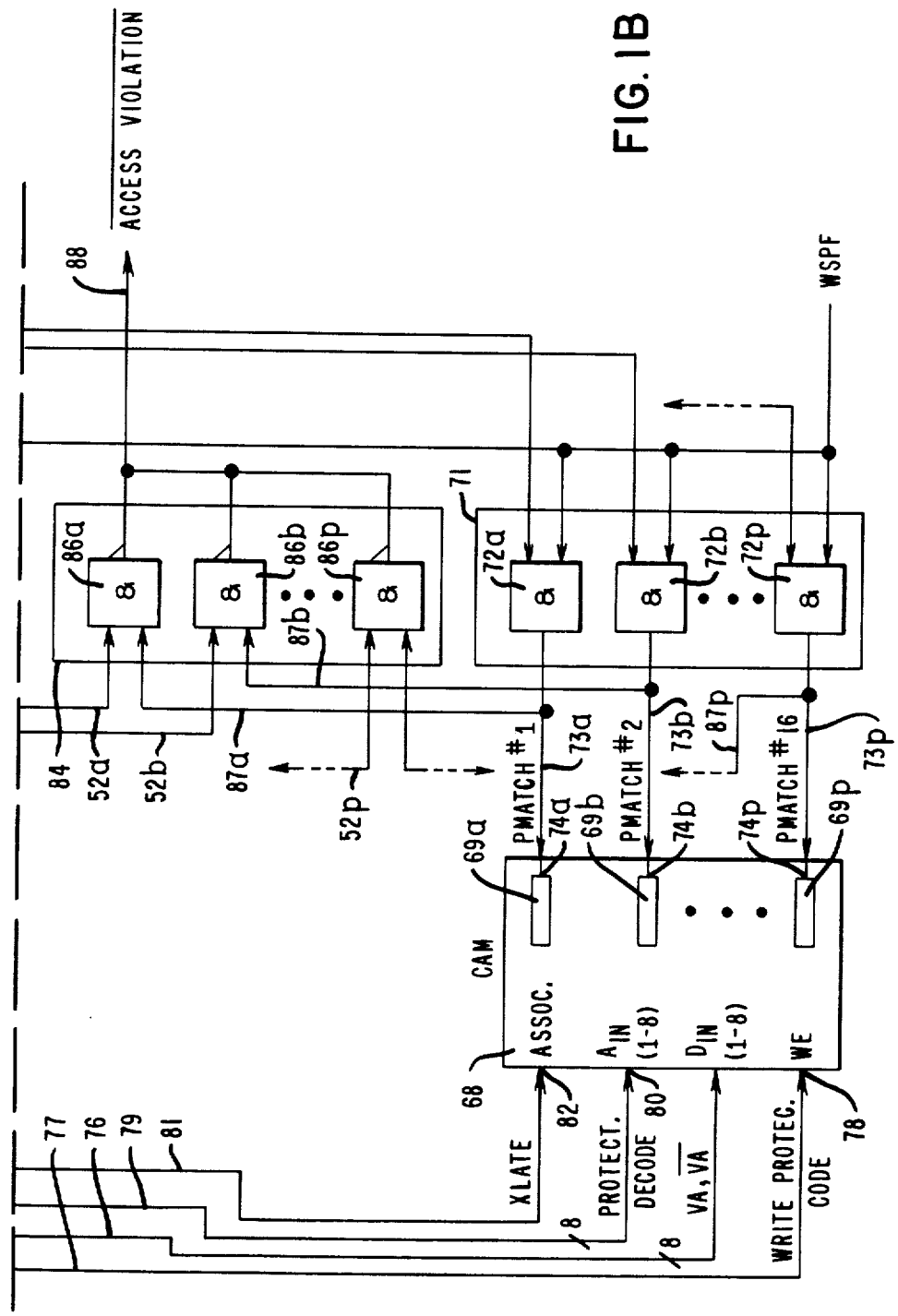

Referring to FIGS. 1A and 1B, and more specifically to the circuit in FIG. 1A: a content addressable memory 36 (CAM) has a number of storage locations 37a–37p in which virtual addresses are stored after the data stored at those addresses has been fetched from a less easily accessible memory and stored in a memory more easily accessible to a processor 38. In this embodiment, the CAM 36 has locations for storing sixteen such addresses, which are introduced to the CAM by two multiwire buses 39 and 41. Both of these buses are labeled VA and VA to indicate that they carry virtual address bits of both 1 and 0 types. A CAM suitable for the purpose is the type 10155 ECL CAM produced by Signetics. The reference to a specific part number in this instance, as in other instances hereinafter, is only for illustrative purposes and is not to be considered as limiting the invention. While the CAM 36 is indicated as a single unit, a single Signetics type 10155 CAM is capable of storing only eight 2-bit addresses, and so it is necessary to concatenate sixteen such CAMs to serve the purpose required of the CAM 36. Concatenation of this type is standard practice in the computer industry.

The selection of the particular storage location in which to store a given address in a first set of such storage locations 37a–37p is determined by any one of a number of well-known address-replacement strategies. There is no problem in selecting the particular one of the locations 37a–37p in which to store each of the first sixteen virtual addresses. Thereafter, each time another address has to be fetched to be stored in the CAM 36, some strategy must be used to determine which one of the addresses already stored there must be replaced. One replacement strategy is a random replacement strategy in which any of the addresses presently in the CAM may be replaced. A somewhat more orderly, but not always more efficient, strategy is called the FIFO strategy because it removes the addresses in the order in which they were stored. Other well-known strategies are to replace the address least frequently used or the one that has been least recently referenced. The circuit in FIG. 1A can use any of these strategies, and others.

Whichever strategy is chosen, the replacement sequence is controlled by signals supplied to an encoder 42 such as may be formed by concatenating two Motorola type 10165 encoders. The encoder has sixteen input terminals 43a–43p, and when one of them is supplied with an activating signal, the circuit in the encoder generates a 4-bit address signal corresponding to the number of the activated input terminal. The 4-bit address number is applied to lines 46a–46d that connect the output terminals of the encoder 42 to corresponding 4-bit input terminals of a decoder 47. A suitable decoder for this purpose can be provided by concatenating two type 10162 decoders produced by Motorola. The decoder 47 has sixteen output terminals 48a–48p, and the operation of the decoder is such that the 4-bit address supplied to it by the lines 46a–46d activates one of the sixteen output terminals 48a–48p.

Each of the output terminals of the decoder 47 is connected to an input terminal of one AND gate 49a–49p of a sixteen gate structure 51. The output terminal of each of the AND gates 49a–49p is connected by an individual line 52a–52p to a respective one of a set of lines 44a–44p leading to input storage control terminals 50a–50p of the respective memory locations 37a–37p in the CAM 36. All of the AND gates 49a–49p are enabled by a common signal WSPF that is active, i.e., has the value 1, during the time any virtual address is to be stored in one of the memory locations 37a–37p. A particular one of the AND gates 49a–49p fully enabled by a 1 on the WPSF line and a 1 from one of the output terminals 48a–48p of the decoder 47 causes the output line 52a–52p of that AND gate to go active, i.e., to have a 1 value placed on it. For example, if the AND gate 49b is fully enabled, a signal having a 1 value will be applied to the output line 52b to be directed both to the input terminal 50b that controls storage of a virtual address in the storage location 37b and to a corresponding input terminal 53b of a set of input terminals 53a–53p of an encoder 54. The encoder 54 is generally similar to the encoder 42, and both of them may be constructed of type 10165 integrated circuits made by Motorola.

The encoder 54 has, in this embodiment, sixteen input terminals 53a–53p and five output terminals 56a–56e. The output terminals 56a–56d constitute the terminals from which a 4-bit binary address to any one of sixteen memory locations may be obtained, corresponding to whichever one of the input terminals 53a–53p has a 1 signal applied to it. The terminal 56e has an output signal when none of the terminals 53a–53p has a 1 on it.

The 4-bit address on the terminals 56a–56d corresponding to the virtual address recorded in the one of the storage locations 37a–37p is one of sixteen addresses in a translation map 57. Each of these addresses identifies the real memory address of one of the blocks of information fetched from the secondary memory along with its virtual address stored in the CAM 36. Information from the map 57 to select the corresponding real memory address is conveyed by a bus 58.

The circuit described thus far corresponds primarily to prior art circuits using content addressable memories and real memories to obtain fast access to selected information from a less accessible memory.

The operation of the part of the circuit in FIG. 1A will be described in conjunction with the timing diagrams shown in FIG. 2. When the system clock generates a clock pulse 59 as the final step in indicating that the system desires to have access to information stored at a certain virtual address, the processor 38 generates the bits making up that virtual address, and this generation takes place during a time interval $T_1$ indicated in FIG. 2.

At the end of that time, which is dependent on the speed of operation of the system, the virtual address 61 is stable on the bus lines 39 and 41, and a translation signal (XLATE) is applied from the processor 38 via the line 62 leading to the ASSOC. terminal 60 of the content addressable memory 36. This places the memory in its associative mode in which the program-generated virtual address is compared with all of the addresses stored at the locations 37a–37p to find out if one of them matches the program-generated address. The address-matching operation takes place during the interval $T_{AT}$ in FIG. 2 and can be completed at any time within the interval indicated by the diagonally hatched area 63. A match will be found more often than not, and if it is, the time of completing the interval $T_{AT}$ is the time 64. At that time the corresponding one of the match lines 44a–44p will have reached its stable active value, which is understood to be the value 1 in the present embodiment.

As an example, let it be assumed that the address stored at the location 37b matches the processor-generated address, and thus causes the line 44b, which is the MATCH #2 line, to have the active value of 1 on it. During the next step of operation, this active value is applied to the input terminal 53b and is encoded in the encoder 54 to an output address on the 4-bit address lines 56a–56d. This 4-bit address is the address of a block in the map 57. The entry in real memory stored at the address identified by the map 57 is then examined to determine if there are any access control, or protection check, bits associated with it to protect that entry from being accessed for the purpose proposed in the program being executed at that instant by the processor 38. The time required from the time 64 of obtaining a stable condition on one of the match lines, such as the match line 44b, to obtaining stable check bits 66 is indicated in FIG. 2 as the time interval $T_{PBA}$.

Figure 2:
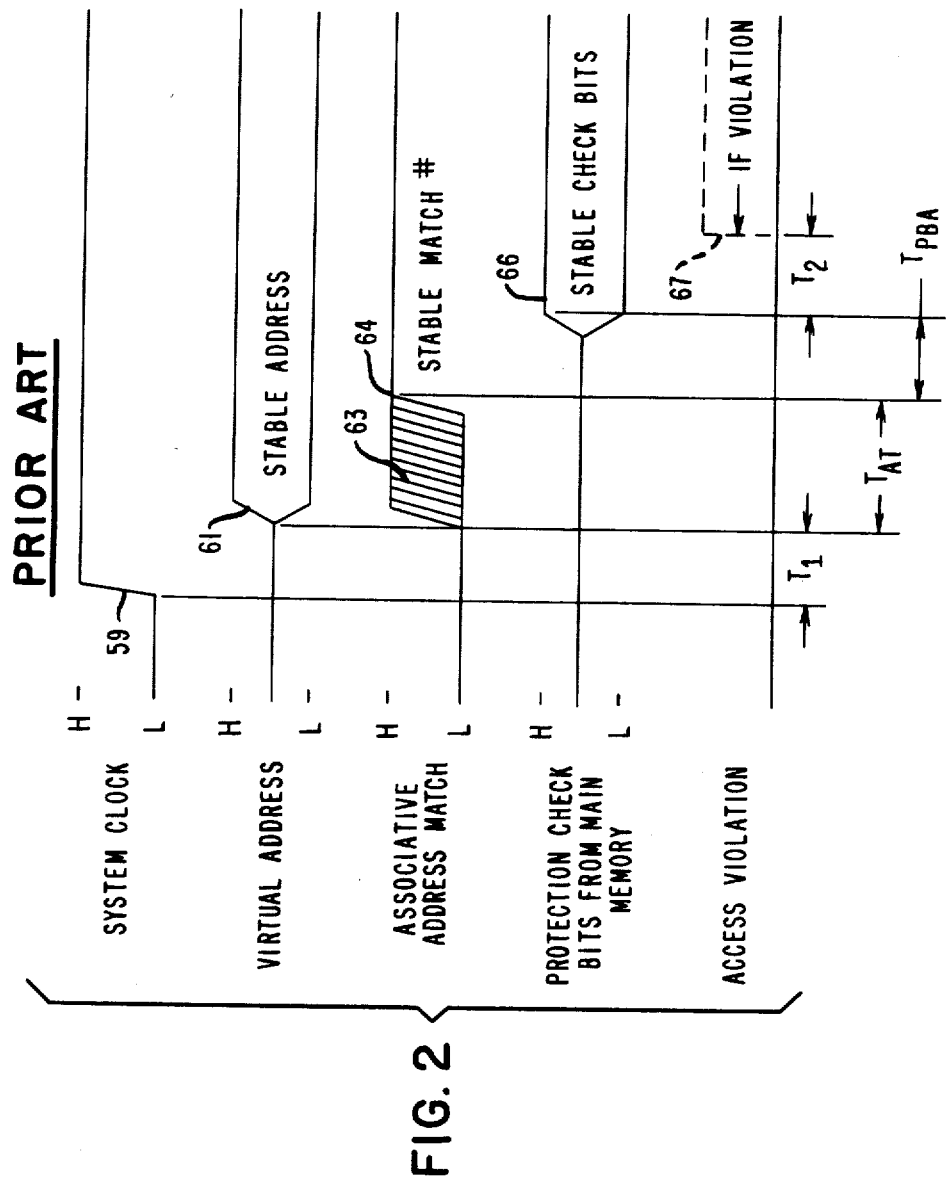
FIG. 2 is a timing diagram for a two-step prior art approach for obtaining an associative address match and, thereafter, a protection check.

In the final step, during the time interval $T_2$ indicated in FIG. 2, the protection check bits are compared with program-generated access information to determine whether the program that is being run on the processor can properly access data stored at the real memory address corresponding to the virtual address that led to a match condition on one of the lines 44a–44p or whether an access violation condition, represented by the signal 67, exists. It is perfectly possible for data to be accessed for one purpose, for example, to be read, but not for another purpose, for example, to be modified.

The section of the circuit shown in FIG. 1B is arranged according to the present invention to speed up the determination of access violation.

Access protection information corresponding to the virtual addresses stored in the storage locations 37a–37p of the CAM 36 is stored in corresponding storage locations 69a–69p of a CAM 68. Since the protection information is to be stored in the CAM 68 at the same time as the virtual address information is stored in the CAM 36, the storage operation in the CAM 68 is also controlled by signals from the decoder 47. Each of the output terminals 48a–48p of the decoder in FIG. 1A is not only connected to the multiple AND gate structure 51 but also to another multiple AND gate structure 71 comprising a like number of individual AND gates 72a–72p. Each of the AND gates 72a–72p has an output terminal connected by a line 73a–73p to a storage control terminal 74a–74p of the respective storage locations 69a–69p. The enabling signal WSPF is also applied to the gate structure 71.

The CAM 68 may be identical with the CAM 36, although the number of access protection bits to be stored in each of the locations 69a–69p is not likely to be as great as the number of virtual address bits to be stored in each of the locations 37a–37p. However, the CAM 68 may be formed of a concatenated group of type 10155 content addressable memories, and the extra bit space simply not used.

The CAM 68 has eight input terminals identified as $D_{IN}$ that are connected to an 8-wire bus 76 from the processor 38. The signals transmitted over this bus are indicated by the same symbols VA and $\overline{VA}$, as are used for the virtual signals applied to the CAM 36. However, the VA and $\overline{VA}$ signals applied to the CAM 68 are not the address bits but, instead, are bits that correspond to access protection information, or access attributes, fetched from the less accessible memory (not shown) at the same time the data and virtual address bits were fetched. An enabling signal is placed by the processor 38 on a line 77 leading to a write enable terminal 78 (WE) in order to write protection code information into the selected one of the memory locations 69a–69p.

When the protection code information stored in the memory locations 69a–69p is to be examined, protection decode signals corresponding to the type of access being attempted by the program then in progress in the processor 38 are transmitted over a multiwire bus 79 to eight input terminals A$_{IN}$, and a translation signal XLATE is applied from the processor 38 by way of a line 81 to the ASSOC. terminal 82 of the CAM 68.

One of the differences between the operation of the CAM 36 and that of the CAM 68 is that it is to be expected that no more than one of the virtual addresses will match a program-generated virtual address, whereas it may well be that more than one of the protection code signals stored in the memory locations 69a–69p will match the program-generated protection decode information. For example, several locations may carry information denying any form of access. Or several locations may carry information permitting READ access but denying LINK operation. Four of the most commonly used protection codes protect against reading, writing, linking and execution, but these are not the only possible protection attributes.

When the CAM 36 is placed in its associative mode to determine whether one of the virtual addresses stored in one of the locations 37a–37p corresponds to a program-generated virtual address, the line 62 is activated by a translation signal XLATE, and the processor-generated virtual address is applied by way of the buses 39 and 41. In accordance with the standard operation of content addressable memories, the program-generated virtual address is compared simultaneously with all of the addresses stored in the locations 37a–37p, and if there is a match with any one of them, the line 44a–44p from that selected location will be made active. In this instance, that means that the line will have a 1 signal on it. It is still necessary for the signal on the active line to pass through the encoder 54 and the mapping operation to select the proper real address, but it is not necessary to wait until this is done before determining whether or not there is some limit to the access of information stored at the selected real address.

At the same time that the program-generated virtual address is applied to the CAM 36, a processor decode signal is also generated by the processor 38 and applied by way of the bus 79 to the protection decode terminals 80 of the CAM 68. The program-generated processor decode signal can be compared simultaneously with the signals stored in all of the locations 69a–69p, and if any of them have matching information stored therein, a protection match, or PMATCH, line is activated from that selected storage location (or those storage locations).

The fact that there may be more than one PMATCH obtained in the CAM 68 is of no significance. The circuit is provided with another set of gating means 84 in which each gate 86a–86p performs a Boolean multiplicative function, and, in this instance, is a NAND gate. Each of these NAND gates has one input connection to the respective line 52a–52p from a corresponding one of the gates 49a–49p, which line also connects to the respective match line 44a–44p of the CAM 36. In addition, each of the gates 86a–86p has another input line 87a–87p connected to a corresponding one of the PMATCH lines 73a–73p. Thus, the only one of the gates 86a–86p that can be activated will be one in which both of the input signals are correspondingly active. If, for example, there is an address match signal that places the line 44b in an active state with a 1 signal on it, only the NAND gate 86b will be partially enabled by that signal, and the other NAND gates 86a and 86c–86p will remain inactive. If there is a PMATCH #2 signal on the line 73b as a result of a match with the access information stored in the location 69b, the NAND gate 86b will be fully enabled, and the common output line 88 connected to all of the NAND gates 86a–86p will have a 0 on it. In this embodiment, that is considered to be an access violation as indicated by the legend $\overline{\text{ACCESS VIOLATION}}$. This signal, which is indicative of an attempted access violation, is available to prevent access to the corresponding real memory as soon as, or even earlier than, the address translation is completed to determine the location of that real memory address.

Figure 3:
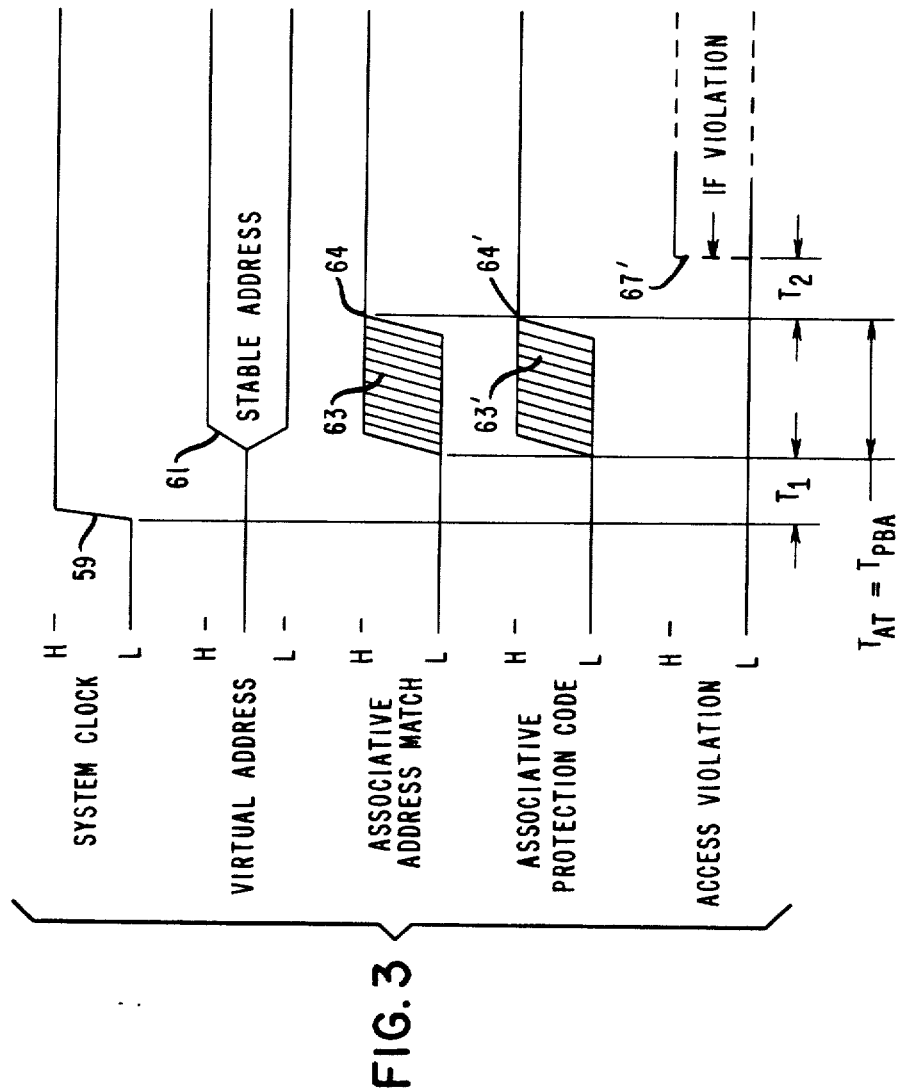
FIG. 3 is a timing diagram illustrating the advantage obtained by the present invention in which an associative address match and a protection check are carried out simultaneously.

The time advantage afforded by the present invention over the FIG. 2 technique is shown by comparison of the timing diagram FIG. 3 with that of FIG. 2. In FIG. 3, the same system clock signal 59 begins the translation and comparison operation, and after a time $T_1$, which is determined by the computer and is independent of the present invention, a stable virtual address signal 61 is obtained, just as in FIG. 2. The translation of the virtual address signal by attempting to obtain an associative address match during the interval 63, which is the interval $T_{AT}$, is also the same as in FIG. 2, and if there is a match, it will be obtained at a time 64, which is not affected by the present invention.

The step that is changed by the present invention is the step of obtaining an associative protection code match, which requires stable check bits 66 to be obtained during the interval $T_{PBA}$ in FIG. 2 but which takes place during the interval 63' in FIG. 3 and is completed by the time 64'. The time 63' starts at the end of the interval $T_1$ just like the associative address match time $T_{AT}$ starts at the end of the interval $T_1$. This is because the stable bit signals for the CAM 68 in FIG. 1B are available at the same time as the stable bit signals for the CAM 36 in FIG. 1A. The only difference between the times 63 and 63' is that one may inherently take a little longer than the other, but that is a factor of the operating characteristics of the computer and of the complexity of the signals being matched. By starting the match of the associative protection code at the end of the time $T_1$, the two sequential steps required to complete the intervals $T_{AT}$ and $T_{PBA}$ in FIG. 2 are combined into a single interval in which it is indicated that $T_{AT}$ is equal to $T_{PBA}$ in FIG. 3. It may well be that the associative protection code match interval 63' will be somewhat shorter than the address match interval 63 and that the associative protection code match will be completed by a time 64' that is actually ahead of the time 64, but the total interval $T_{AT}=T_{PBA}$ will be determined by whichever of the match procedures takes longer and will not be simply a sequential procedure as in the prior art timing indicated in FIG. 2.

Following the matching that takes place in the CAMs 36 and 68 of FIG. 1, it is still necessary to produce the $\overline{\text{ACCESS VIOLATION}}$ signal 67', if access is found not to be permitted, and this time still requires the interval $T_2$.

Figure 4:
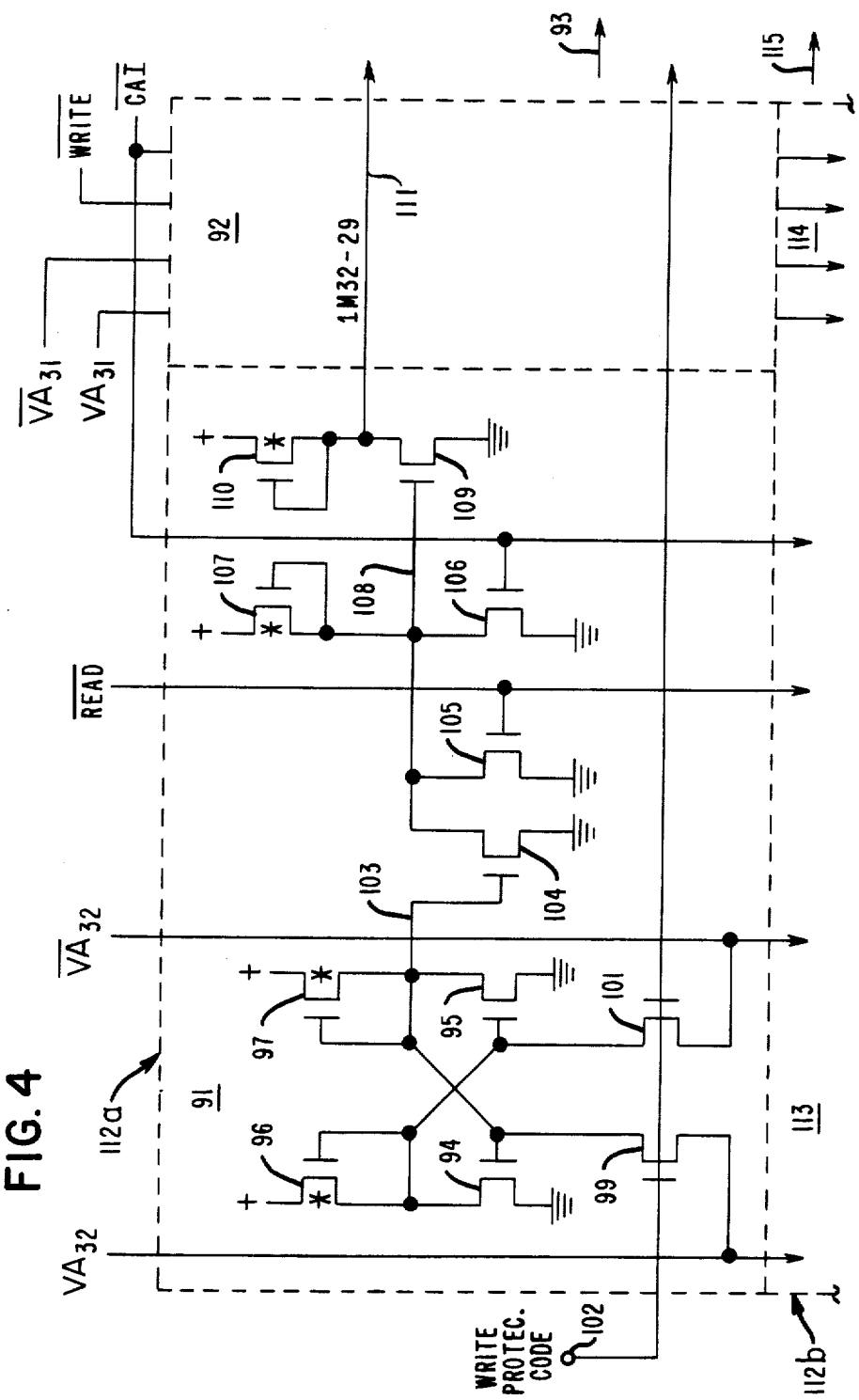
FIG. 4 is a schematic diagram of a part of a circuit for matching stored access information and protection code bits.

FIG. 4 is a more detailed circuit diagram representing a circuit 91 for handling one bit in a content addressable memory like the memory 68 in FIG. 1B, and also representing in more symbolic form a circuit 92 for handling another bit at the same memory location in which there may be several other bits, as indicated by an arrow 93.

The circuit 91 includes the standard latch circuit comprising four field effect transistors 94, 95, 96, and 97, in which the field effect transistors 96 and 97 act as loads for the transistors 94 and 95 and have asterisks to indicate that they are depletion mode field effect transistors (or FETs). Another FET 99 is connected in series between the gate of the FET 94 and a signal line $VA_{32}$ that carries the bit information represented as virtual information. As indicated by the arrowhead at the lower end of the $VA_{32}$ line, this bit signal goes on to other storage locations not shown in FIG. 4. In a similar manner, another FET 101 is connected in series between the gate of the FET 95 and a bit line $\overline{VA}_{32}$, which carries the converse of the signal carried by the line $VA_{32}$. At any given time, either of the lines $VA_{32}$ or $\overline{VA}_{32}$ can have a 1 signal on it. This means that at the same instant, the other of the two lines will have the signal 0 on it. The symbols 1 and 0 are, of course, symbolic in the usual sense of representation in computers. They may also be considered as high and low signals, respectively, or true and false signals. It is typical, but not necessary, for the voltage represented by the symbol 1 to be 5 volts and the voltage represented by the symbol 0 to be 0 volts. All of these possibilities, and more, are well-known to those familiar with the computer art.

The gates of the FETs 99 and 101 are connected to a terminal 102 to which the WRITE PROTECTION CODE signal is applied for all of the circuits 91, 92, and any circuits represented by the arrow 93 in this storage location. When the signal at the terminal 102 goes active, which will be assumed to be the 1 value in this instance, both of the FETs 99 and 101 will become conductive, and the voltage value on the lines $VA_{32}$ and $\overline{VA}_{32}$ at that instant will be applied to the gates of the FETs 94 and 95, respectively. The condition of conductivity of the FETs 94 and 95 will be determined accordingly. For example, if the signal on the line $VA_{32}$ is a 0 at the instant that the FET 99 is made conductive, this 0 value will be applied to the gate of the FET 94, and that FET will then be non-conductive so that the voltage on its drain will be high, which is equivalent to saying that its drain has a 1 value. At the same time, the fact that the FET 101 is made conductive when the FET 99 is made conductive will cause the 1 signal to be applied to the gate of the FET 95 and make that FET conductive. As a result, the drain of that FET will have a low, or 0, value on it. Assuming that the signal applied to the terminal 102 is removed before there is any change in the voltages applied to the gates of the FETs 94 and 95, the FETs 99 and 101 will become non-conductive, and the conditions of conductivity of the FETs 94 and 95 will remain unchanged as long as operating power continues to be applied to the system.

The drain electrode of the FET 95 is considered to be an output terminal 103 of the latch circuit and is connected to the gate of another FET 104. The source and drain electrodes of the latter FET are connected directly in parallel with those of still another FET 105, the gate electrode of which is connected to a processor-generated signal which, for illustrative purposes, is considered to be a $\overline{READ}$ signal that is applied not only to the gate of the FET 105 but, as indicated by the arrowhead of the READ line, is also connected to the corresponding FETs in other storage locations.

There is still another FET that has its source and drain terminals connected in parallel with those of the FETs 104 and 105. This is the FET 106, the gate of which is connected to another processor-generated signal $\overline{CAI}$, which will be described in conjunction with FIG. 5. Like the $\overline{READ}$ signal, the fact that the line connecting the $\overline{CAI}$ signal to the FET 106 has an arrowhead on it indicates that it also goes to other storage locations.

A depletion mode FET 107 supplies current in common to all three of the FETs 104–106, and the FETs 104–107 may be considered to be connected as Boolean alternative gating means, a NOR gate in this instance, in the sense that their output terminal 108 will have a 0 value if a 1 signal is applied to the gates of any of the FETs 104–106 and will have a 1 value only if a 0 signal is applied to the gates of all three of the FETs 104–106.

The output terminal 108 is connected to the gate of another FET 109, the drain of which is connected to a power supply terminal by another depletion mode FET 110. The FETs 109 and 110 constitute an inverter so that if the signal applied to the gate of the FET 109 is a 0 signal, the output signal at its output terminal 111 will be a 1 signal, and vice versa. The line connected to the output terminal 111 bears the legend 1M32-29 indicating that information on it relates to all four of the bits 29–32 and that it relates to the first storage location.

It will be noted that the $\overline{READ}$ signal is applied to the circuit 91 but not to the circuit 92. Instead, a $\overline{WRITE}$ signal is applied to the circuit 92. However, the $\overline{CAI}$ signal is applied to both of these circuits. Thus, the information bit dealt with in the circuit 91 is concerned only with reading access and that in the circuit 92 is concerned only with writing access, the protection code for which is carried by virtual signals $VA_{31}$ and $\overline{VA}_{31}$.

Concentrating only on the reading access, it will be recognized that there are four possible conditions:
1. Reading access is prohibited but attempted.
2. Reading access is prohibited and not attempted.
3. Reading access is allowed and attempted.
4. Reading access is allowed but not attempted.

Obviously, the only condition that must create an indication of violation is the first condition. In this embodiment, the circuit is arranged so that virtual information indicating prohibition of access will cause the output terminal 103 to have a 0 on it. As a result, the FET 104 will not be conductive. If a 0 signal is also applied to the $\overline{READ}$ and the $\overline{CAI}$ terminals from the processor 38 in FIG. 1, none of the three FETs 104–106 will be conductive, and the output terminal 108 will be a 1. As a result, the FET 109 will be conductive and its output terminal 111 will be a 0.

Circuits 91 and 92 and others on the same level correspond to a storage location 112a in a content addressable memory, and below this storage location is another storage location 112b that includes circuits 113–115 which are only symbolically indicated.

Figure 5A:
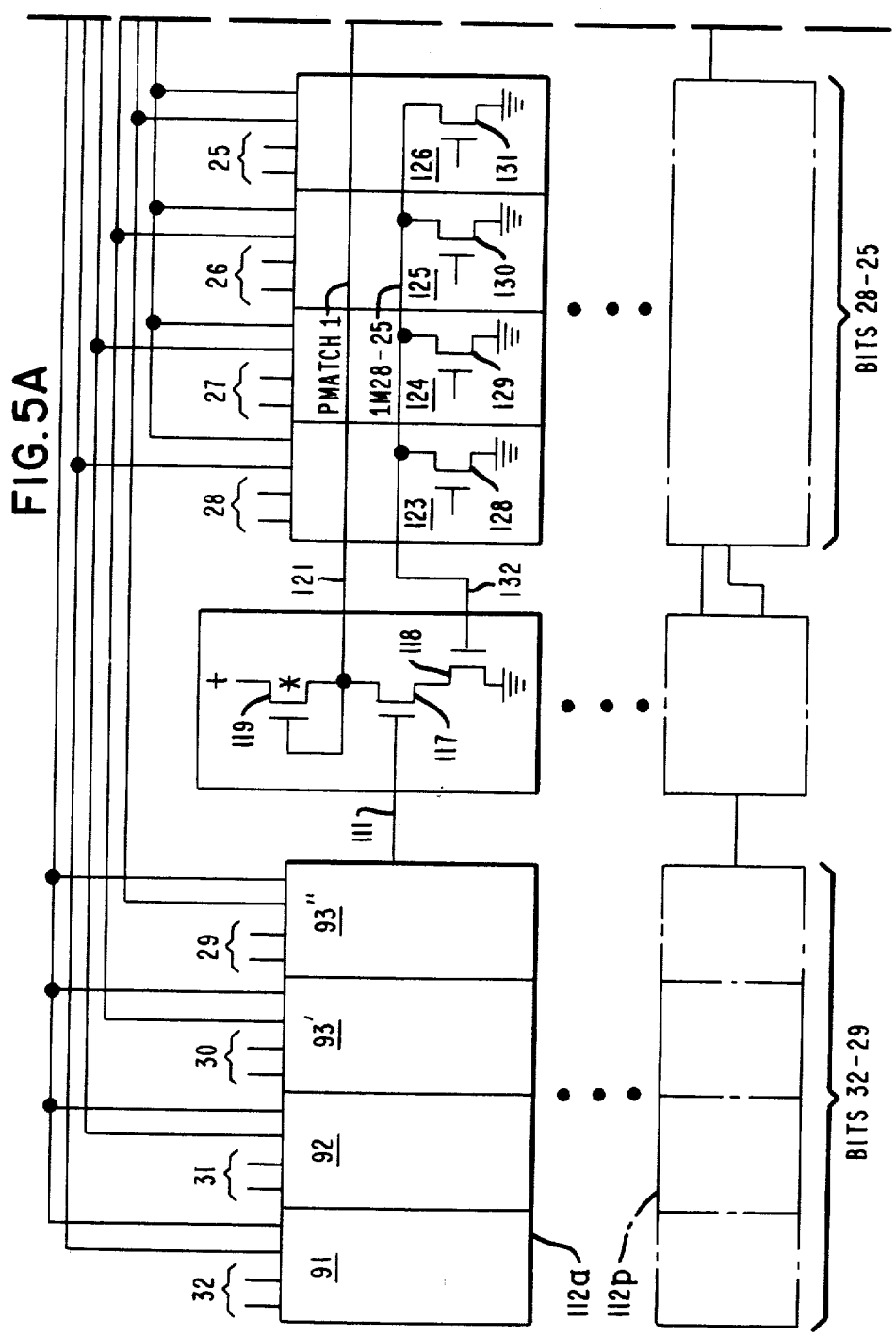
FIGS. 5A and 5B are a diagram, partly in block form for a portion of the system in FIGS. 1A and 1B for comparing stored access information and protection code bits.
Figure 5B:
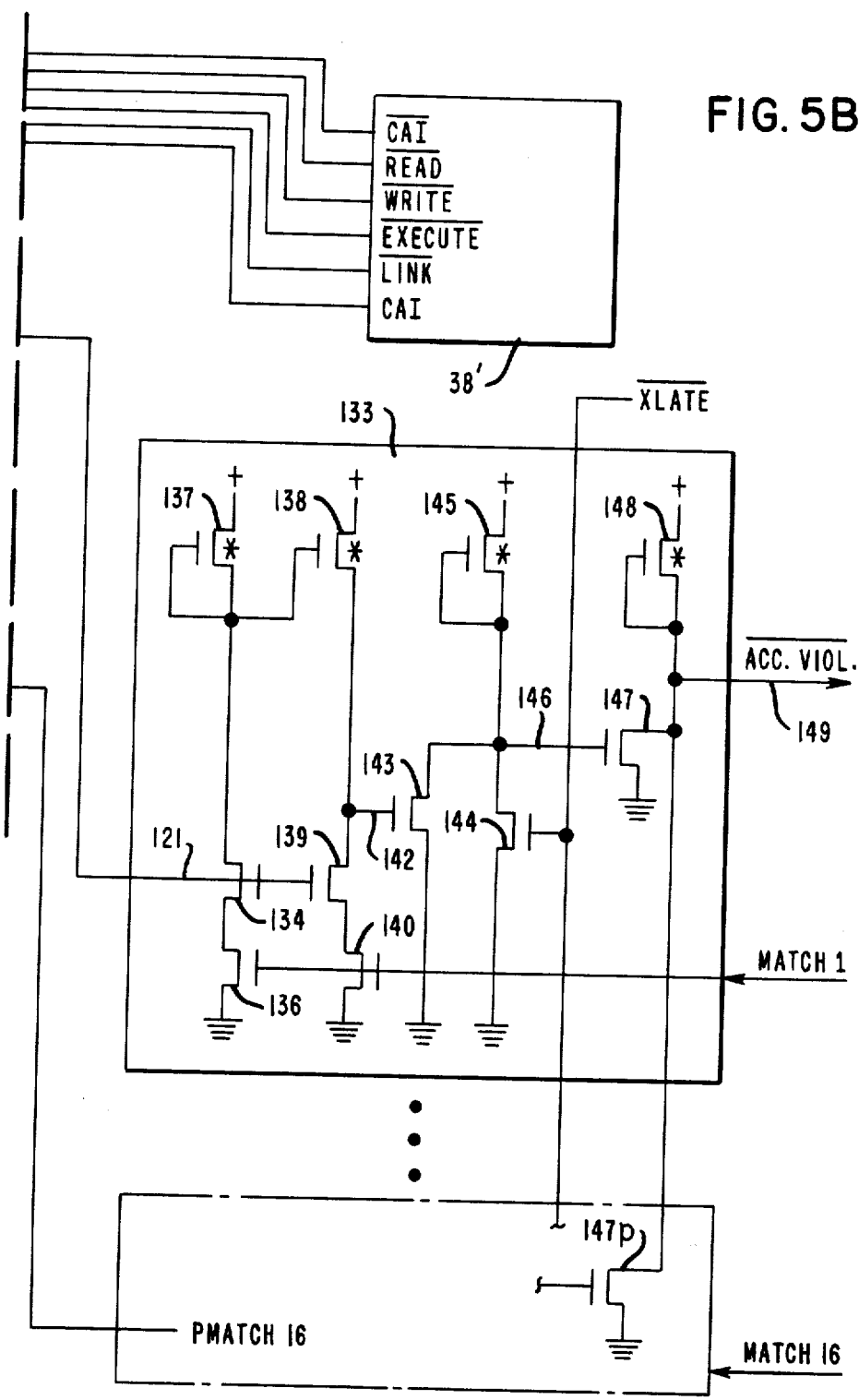

FIGS. 5A and 5B, taken together, show the content addressable memory in which the circuit 91 in FIG. 4 is repeated 127 more times. As in the case of the CAMs 36 and 68 in FIGS. 1A and 1B, the embodiment in FIG. 5A includes sixteen storage locations 112a–112p, each of which is made up of bit circuits identical with the circuit 91 in FIG. 4. In fact, the circuit 91 is shown symbolically as the upper left hand block in FIG. 5A, and the virtual bit signals $VA_{32}$ and $\overline{VA}_{32}$ of FIG. 4 are indicated as being received on bus lines 32. The circuit blocks to the right of the circuit block 91 are indicated by references 92 and 93' and 93", and they receive pairs of complementary bit signals over bus lines 31, 30, and 29, respectively.

This circuit is arranged to handle four access protection bits, one controlling reading, a second controlling writing, a third controlling execution, and a fourth controlling linking. In addition, this embodiment is arranged so that the access permission states may be either privileged, as indicated by the symbol CAI, or non-privileged, as indicated by the symbol $\overline{\text{CAI}}$. All of these signals are program-generated, for example in a section 38' of the processor 38 in FIG. 1A.

It is convenient to divide the circuits having to do with $\overline{\text{READ}}$, $\overline{\text{WRITE}}$, $\overline{\text{EXECUTE}}$, and $\overline{\text{LINK}}$ into two groups, one of which receives the CAI signal, and the other the $\overline{\text{CAI0}}$ signal.

Since the $\overline{\text{CAI}}$ signal is a 0 when the CAI signal is a 1 and vice versa, these signals tend to control the entire group of circuits to which they are connected. This may be seen by referring to FIG. 4. If the $\overline{\text{CAI}}$ signal is a 1, indicating that, in the case of circuit 91, access is not privileged for the address to which the circuit 91 happens at the moment to be related, the FET 106 will be conductive and the output terminal 108 will be 0, no matter whether the FETs 104 and 105 are conductive or not. Because this is a NOR circuit, conductivity of any one of these three FETs is the controlling factor in determining that the level at the output terminal 108 will be 0. Therefore, since the $\overline{\text{CAI}}$ signal is applied to all of the circuits 91, 92, 93', and 93" in FIG. 5A, if the signal $\overline{\text{CAI0}}$ is a 1, the output terminal 111 will be a 1 independently of the state of the virtual signals when they were recorded from the buses 29–32 and independently of the $\overline{\text{READ}}$, $\overline{\text{WRITE}}$, $\overline{\text{EXECUTE}}$ and $\overline{\text{LINK}}$ signals from the processor section 38' shown in FIG. 5B. The output terminal 111 is connected to the gate of a FET 117, the source-drain circuit of which is connected in series with that of another FET 118. The source-drain circuit of a third FET 119 is, in effect, a load for the FETs 117 and 118. The common connection between the FETs 117 and 119 is the output terminal 121 of this circuit and is the PMATCH 1 line for this content addressable memory corresponding to the PMATCH 1 line of the CAM 68 in FIG. 1.

The storage location 112a has four circuits 123–126 connected to the CAI signal from the processor section 38' and having respective FETs 128–131 that correspond to the FET 109 in FIG. 4 and are connected to an output terminal 132 leading to the gate of the FET 118.

As has just been explained, because of the opposite status of the CAI and the $\overline{\text{CAI}}$ signals, either the output terminal 111 or the output terminal 132 will have to have a 1 signal on it, making its corresponding FET 117 or 118 conductive. However, it is not essential that both of the output terminals 111 and 132 have a signal of the same level on them, and it is perfectly possible for both of the FETs 117 and 118 to be conductive or for either one of them to be conductive, but it is not possible for both of them to be non-conductive. However, if both of the FETs 117 and 118 are conductive, the output terminal 121 to the PMATCH 1 line will be low, or 0, indicating that there is no objection to access to data stored at the address from which the access control information stored in location 112a was derived. On the other hand, if the signal from any one of the circuits making up the storage location 112a causes either of the output terminals 111 or 132 to have a 0 on it, the output terminal 121 for PMATCH 1 will be high, and this is indicative of an attempt to access improperly the corresponding address in the real memory.

FIG. 5B shows a circuit 133 that corresponds to one of the NAND gates 86a–86p in FIG. 1. Actually, the circuit 133 includes more than a NAND function. In fact, its first three FETs 134, 136, and 137 perform the NAND function. The gate of the FET 134 is connected to the output terminal 121 that supplies the PMATCH 1 signal, and the gate of the FET 136 is connected to the MATCH 1 signal corresponding to the signal on the line 44a in FIG. 1. Current is supplied to the FETs 134 and 136 through a depletion mode FET 137, and only if both the PMATCH 1 signal and the MATCH 1 signal have a high value of 1 will both of the FETs 134 and 136 be conductive, thereby applying a low, or 0, signal to the gate of a FET 138. The source-drain circuit of the latter FET is connected in series with the source-drain circuits of two other FETs 139 and 140. The gate of the FET 139 is connected directly to the gate of the FET 134, and the gate of the FET 140 is connected directly to the gate of the FET 136 so that the conditions of conductivity of the FETs 134 and 139 match exactly, and the conditions of conductivity of the FETs 136 and 140 also match exactly. As a result, the NAND function performed by the FETs 134, 136, and 137 is reinforced by the FETs 138–140, and the output terminal 142 connected to the drain of the FET 139 will be 0 only if both the PMATCH 1 signal and the MATCH 1 signal have a value of 1.

The signal at the terminal 142 is applied to the gate of a FET 143 and controls the conductivity of that FET. The source-drain circuit of the FET 143 is directly connected in parallel with the source-drain circuit of another FET 144 that has the $\overline{\text{XLATE}}$ signal applied to its gate. The FETs 143 and 144 have a common load FET 145 and a common output terminal, which will be forced to 0 if either of the FETs 143 or 144 is conductive. Thus, if the $\overline{\text{XLATE}}$ signal is a 1, the terminal 146 will be a 0 no matter what the condition of any of the circuit components to the left of the FET 144 may be, and no matter whether there is a match between the PMATCH 1 signal and the MATCH 1 signal. It is only when translation is desired and the $\overline{\text{XLATE}}$ signal is reduced to 0 that the remainder of the circuit comes into play. Furthermore, as indicated by the fact that the $\overline{\text{XLATE}}$ line extends to the level of other storage locations, including the sixteenth storage location 112p, the $\overline{\text{XLATE}}$ signal determines whether any part of this content addressable memory is capable of operating in the translate mode.

Assuming that the $\overline{\text{XLATE}}$ signal is a 0 so that the FET 144 is non-conductive, the condition of conductivity of the FET 143 will determine the level of the signal at the output terminal 146. If, as has been considered, there is a match between the PMATCH 1 signal and the MATCH 1 signal, causing the FET 143 to be non-conductive, the level at the output terminal 146 will be high. The terminal 146 is connected to the gate of an output FET 147 supplied with current through a depletion mode FET 148. Similar output FETs, including an output FET 147p, are provided in each of the storage locations in the content addressable memory shown in FIGS. 5A and 5B, and the $\overline{\text{ACCESS VIOLATION}}$ output terminal 149 labeled in FIG. 5B as $\overline{\text{ACC VIOL}}$ is connected to the common drain terminal of all of the FETs 147–147p. If any one of these FETs is conductive, the output terminal 149 will be 0, and only if all of them are non-conductive will it be high. However, since it is to be expected that, at most, only one of the MATCH 1-MATCH 16 lines will be high, only one of the output FETs 147-147p will be effective at any given time in determining the level of the output terminal 149.

While this invention has been described in terms of specific embodiments, those skilled in the art will understand that modifications can be made therein without departing from the true scope of the invention.

I claim:

1. In a memory system including address storage means for storing a plurality of addresses, said address storage means having a plurality of address storage locations, information storage means for storing information related to each address of the plurality of addresses, address interrogating means for interrogating the address storage locations for a predetermined address, and address match signal generating means responsive to the address interrogating means for generating an address match signal if the predetermined address is stored in the address storage means, the improvement comprising:
protection code storage means for storing a plurality of protection codes, said protection code storage means having a plurality of protection code storage locations with each of said protection code storage locations corresponding to one of the address storage locations;
protection code interrogating means for interrogating each of said protection code storage locations for a predetermined code, said protection code interrogating means operation being simultaneous with the operation of the address interrogating means;
protection code match signal generating means responsive to said protection code interrogating means for generating a protection code match signal for each match of the predetermined code to said protection codes stored in said protection code storage locations; and
logic means for generating an information storage access signal responsive to the address match signal and a corresponding protection code match signal, whereby access to information stored in the information storage means related to the predetermined address is controlled by the presence of the predetermined address in one of the address storage locations and the concurrent presence of the predetermined code in the corresponding protection code storage location.

2. The memory system of claim 1 further comprising access violation means connected to said logic means for preventing access to the information storage means responsive to the generation of said information storage access signal.

3. In a method for accessing a memory comprising storing as stored addresses, a plurality of addresses, storing information related to each address of the plurality of addresses, interrogating the stored addresses for a predetermined address, and generating an address match signal if the predetermined address is among the stored addresses, the improvement comprising:
storing as stored protection codes, a plurality of protection codes, each of said stored protection codes corresponding to one of the stored addresses;
simultaneous with interrogating the stored addresses, interrogating each of said stored protection codes for a predetermined code;
generating a protection code match signal for each match of the predetermined code to said stored protection codes; and
generating an information storage access signal responsive to the address match signal and a corresponding protection code match signal, whereby access to stored information related to the predetermined address is controlled by the presence of the predetermined address among the stored addresses and the concurrent presence of the predetermined code in the corresponding stored protection code.

4. The memory system of claim 3 further comprising preventing access to the stored information responsive to the generation of said information storage access signal.

5. A memory system comprising:
virtual address storage means for storing a plurality of program-generated virtual addresses, said virtual address storage means having a plurality of virtual address storage locations;
real address storage means for storing a plurality of real addresses corresponding to the virtual addresses stored in said virtual address storage means;
virtual address interrogating means for interrogating said virtual address storage locations for a predetermined virtual address;
address match signal generating means responsive to said virtual address interrogating means for generating an address match signal if the predetermined virtual address is stored in said virtual address storage means;
address encoder means responsive to said address match signal means for selecting from said real address storage means, the real address corresponding to the predetermined virtual address;
protection code storage means for storing a plurality of protection codes, said protection code storage means having a plurality of protection code storage locations with each of said protection code storage locations corresponding to one of said virtual address storage locations;
protection code interrogating means for interrogating said protection code storage locations for a predetermined code, said protection code interrogating means operation being simultaneous with the operation of said virtual address interrogating means;
protection code match signal means responsive to said protection code interrogating means for generating a protection code match signal for each match of the predetermined code to said protection codes stored in said protection code storage means;
logic means for generating an access control signal responsive to said virtual address match signal and a corresponding protection code match signal, whereby generation of said access control signal is controlled by the presence of the predetermined virtual address in one of the virtual address storage locations and the concurrent presence of the predetermined code in the corresponding protection code storage location.

6. The memory system of claim 5 further comprising:
information storage means for storing information related to the real addresses stored in said real address storage means; and
access violation means responsive to the access control signal from said logic means for preventing access to the information stored in said information storage means upon the generation of the access control signal by said logic means.

7. The memory system of claim 5 further comprising processor means for simultaneously providing the predetermined virtual address to said virtual address interrogating means and the predetermined code to said protection code interrogating means such that said access control signal is generated at least as early as the real address corresponding to the predetermined address being selected from said real address storage means.

8. The memory system of claim 5 wherein said real address storage means and said protection code storage means are each content addressable memories.

9. The memory system of claim 5 wherein:
said address match signal generating means includes a separate virtual address storage location outlet terminal for each of said virtual address storage location;
said protection code match signal generating means includes a separate protection code storage location outlet terminal for each of said protection code storage locations;
said logic means includes a plurality of logic elements, each logic element having a first input connected to one of said virtual address storage location outlet terminals, a second input connected to a corresponding one of said protection code storage location output terminals, and a logic element output terminal; and
all of said logic element output terminals being connected to a common output terminal for providing said access control signal when at least one of said logic elements is enabled.

10. The memory system of claim 9 wherein said logic elements are NAND gates.

* * * * *